(12) United States Patent
Huf

(10) Patent No.: US 12,121,058 B2
(45) Date of Patent: Oct. 22, 2024

(54) VAPORIZER SYSTEM

(71) Applicant: Alexander Huf, Los Angeles, CA (US)

(72) Inventor: Alexander Huf, Los Angeles, CA (US)

( * ) Notice: Subject to any disclaimer, the term of this patent is extended or adjusted under 35 U.S.C. 154(b) by 91 days.

(21) Appl. No.: 18/298,812

(22) Filed: Apr. 11, 2023

(65) Prior Publication Data

US 2023/0248060 A1  Aug. 10, 2023

Related U.S. Application Data

(63) Continuation-in-part of application No. 17/061,208, filed on Oct. 1, 2020, now Pat. No. 11,653,703.

(51) Int. Cl.
| | |
|---|---|
| *A24F 40/57* | (2020.01) |
| *A24F 40/10* | (2020.01) |
| *A24F 40/42* | (2020.01) |
| *A24F 40/46* | (2020.01) |

(52) U.S. Cl.
CPC .............. *A24F 40/42* (2020.01); *A24F 40/10* (2020.01); *A24F 40/46* (2020.01); *A24F 40/57* (2020.01)

(58) Field of Classification Search
None
See application file for complete search history.

(56) References Cited

U.S. PATENT DOCUMENTS

| | | |
|---|---|---|
| 10,021,914 B2 | 7/2018 | Liu |
| 10,398,177 B2 | 9/2019 | Xiang |
| 2008/0077802 A1 | 3/2008 | Richardson et al. |
| 2009/0126745 A1* | 5/2009 | Hon ............ H01M 10/425  131/273 |
| 2011/0226236 A1* | 9/2011 | Buchberger ...... A61M 15/0021  128/200.23 |
| 2015/0272222 A1 | 10/2015 | Spinka et al. |
| 2015/0366266 A1 | 12/2015 | Chen |
| 2018/0020729 A1 | 1/2018 | Alarcon et al. |

FOREIGN PATENT DOCUMENTS

| | | | | |
|---|---|---|---|---|
| GB | 2533651 A | * | 6/2016 | ............. A24F 40/50 |
| KR | 20150064754 A | * | 6/2015 | |
| WO | WO-2015177046 A1 | * | 11/2015 | ............. A24F 40/42 |

* cited by examiner

*Primary Examiner* — Cynthia Szewczyk
(74) *Attorney, Agent, or Firm* — Clement Cheng

(57) ABSTRACT

A vaporizer system has a cartridge section. The cartridge section has a cartridge connector connecting to a resistance heater formed as a coil, a resistance temperature detector, and a cartridge section cryptography chip. A battery section connects to the cartridge section at the cartridge connector. A battery is mounted within the battery section. The battery section further includes a microcontroller unit with a memory. The microcontroller unit is electrically connected to a resistance temperature detector converter. The resistance temperature detector converter is electrically connected to the resistance temperature detector when the battery section is connected to the cartridge section at the cartridge connector. A power board includes a coil power MOSFET.

20 Claims, 13 Drawing Sheets

VAPORIZER SYSTEM

FIELD OF THE INVENTION

The present invention is in the field of electronic cigarettes, and more specifically electronic cigarette vaporizer systems.

SUMMARY OF THE INVENTION

A vaporizer system has a cartridge section. The cartridge section has a cartridge connector connecting to a resistance heater formed as a coil, a resistance temperature detector, and a cartridge section cryptography chip. A battery section connects to the cartridge section at the cartridge connector. A battery is mounted within the battery section. The battery section further includes a microcontroller unit with a memory. The microcontroller unit is electrically connected to a resistance temperature detector converter. The resistance temperature detector converter is electrically connected to the resistance temperature detector when the battery section is connected to the cartridge section at the cartridge connector. A power board includes a coil power MOSFET.

The coil power MOSFET is configured to control a battery output to a coil power that passes through the cartridge connector from the battery section to the cartridge section. The coil power heats the coil. A current sense resistor is mounted in the battery section. The current sense resistor senses current of the coil power.

The resistance temperature detector converter converts analog inputs of the resistance temperature detector for the microcontroller unit. The power board includes a calibration MOSFET that assists in calibration of the coil temperature. The micro controller unit is configured to calculate dosage, based on a user pressing an activation button. The microcontroller unit is configured to calculate dosage with a dosage calculation protocol which includes the substeps of: logging a total duration of user activation button pressing; logging an amperage at set intervals during the user activation button pressing; logging a coil voltage at set intervals during user activation button pressing; calculating power usage during user activation button pressing; calculating volume of liquid turned into vapor by power usage; retrieving manufacturer programmed potency on the cartridge section; using volume and potency to calculate a total dose; and updating the total dose on the memory.

The microcontroller unit is configured to calibrate the cartridge section with a calibration MOSFET. The micro controller unit is configured to calculate dosage with a dosage calculation protocol which includes the substeps of: activating the calibration MOSFET; receiving an RTD value; calculating a car voltage drop and current flow ADC readings; calculating interim coil resistance value; using resistance value to calculate coil starting temperature; and comparing coil starting temperature to the RTD value.

The micro controller unit is configured to detect the cartridge section and verify the authenticity of the cartridge section. The micro controller unit is configured to detect the cartridge section and verify the authenticity of the cartridge section which includes the substeps of: retrieving a chip serial number from the cartridge section cryptography chip; generating a random number with the battery section cryptography chip; sending a random number to the cartridge section cryptography chip; enabling the cartridge section cryptography chip to hash a cartridge section cryptography chip random number from a factory key; receiving the cartridge section cryptography chip hashed number from the cryptography chip; enabling the battery section cryptography chip to hash the same random number with the factory key to generate a battery section cryptography chip hashed number; and comparing the battery section cryptography chip hashed number to the cartridge section cryptography chip hashed number.

The microcontroller is configured to calibrate a temperature of the coil. The vaporizer system has a battery section cryptography chip mounted in the battery section and a cartridge section cryptography chip mounted in the cartridge section. The cartridge section cryptography chip is mounted in the cartridge section. The battery section cryptography chip matches the cartridge section cryptography chip and can authenticate through the microcontroller unit.

Figure 1:
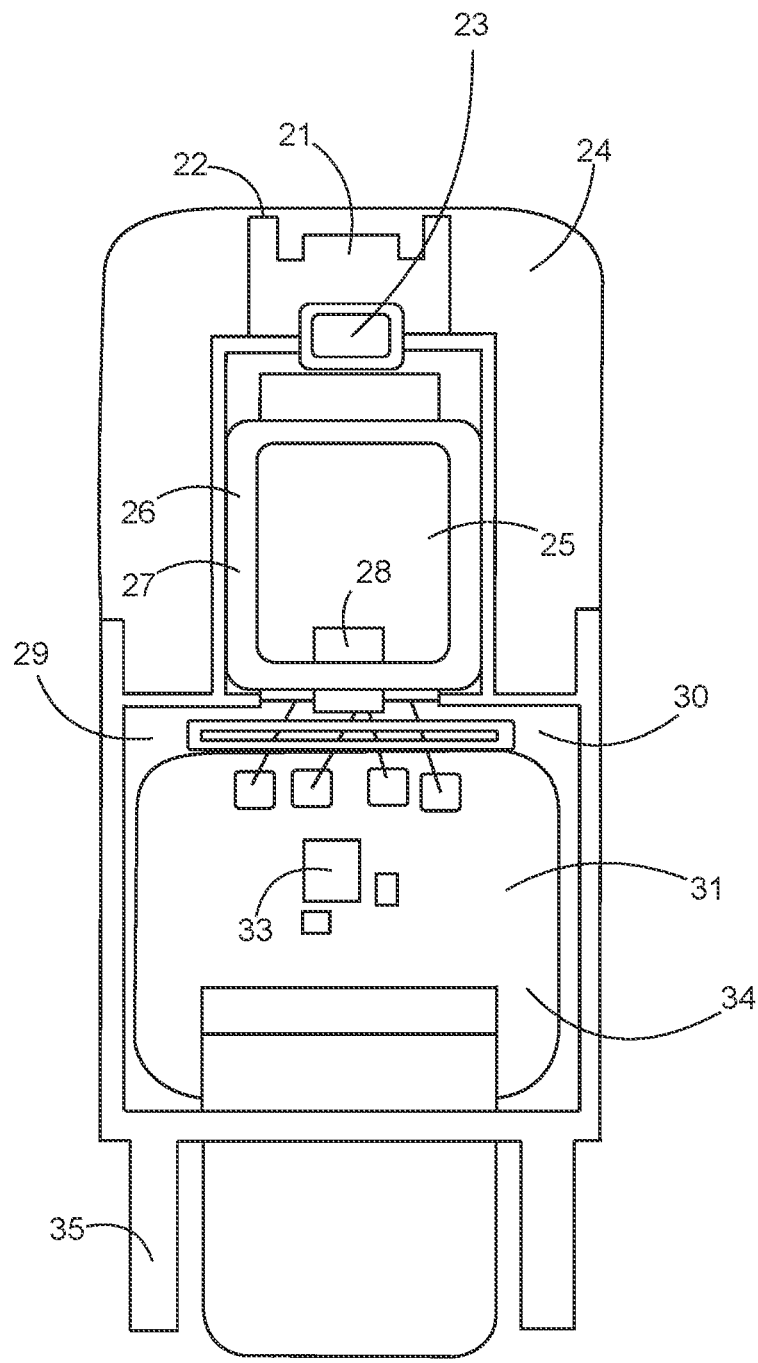
FIG. 1 is a cross section diagram showing an electronic cigarette.

The following call out list of elements can be a useful guide in referencing the element numbers of the drawings.

21 mixing and cooling chamber
22 vapor outlet
23 airflow chimney
24 vaporizing liquid storage tank
25 ceramic coil
26 cotton wrap (for ceramic coil and RTD)
27 distillate sponge
28 resistance thermal detector (RTD)
29 air inlet gasket filter
30 coil lower sealing gasket
31 printed circuit board (PCB)
32 connecting points (for coil and RTD)
33 crypto chip
34 universal serial bus type C twenty four pin plug
35 keyed plastic guides
40 cartridge connections
41 cartridge crypto chip date
42 RTD+/−power
43 RTD sense+/−voltage
44 ground
45 coil sense+/−voltage
46 coil power
47 coil current sense voltage
48 SPI & I²C data
49 MOSFET PWM control
50 electronic components
51 current sense resistor 52 current sense amp
53 analog to digital converter (ADC)
54 micro controller unit (MCU)
55 resistance temperature detector converter (RTDC)
56 power board
57 calibrating MOSFET
58 coil power MOSFET
59 battery
60 cartridge section
70 battery section
101 cartridge detection & integrity check
102 cartridge authentication
103 cartridge detection loop
104 cartridge calibration
105 retrieve & show manufacturing info
106 wait for user action
107 true temp control management loop
108 calculate dosing
109 update cart usage details
110 chart update loop
111 check for open circuit errors on ADC and RTD converter
112 check for RTD sensor value
113 verify RTD value in operating range
114 open calibration MOSFET
115 check for test current flow across coil
116 if current flow & proper RTD value: cartridge detected
117 if no current flow & proper RTD value: coil error shown
118 if current flow & improper RTD value: RTD error shown
119 check for crypto chip (Get Chip Serial Number)
120 generate random number with battery crypto chip
121 send random number to cartridge crypto chip
122 cartridge chip hashes random number (with factory key)
123 battery retrieves hashed number from cartridge chip
124 battery chip hashes the same random number (factory key)
125 battery compares cartridge hash value with internal hash value
126 if matched=genuine if not=fake
127 turn on calibration MOSFET
128 get RTD value after one second
129 enter calibration loop
130 get coil voltage drop and current flow ADC readings
131 calculate interim coil resistance value
132 use resistance value to calculate coil starting temp
133 compare start temp to RTD value
134 enter loop again while coil temp not within one percent of RTD value
135 calibration loop
136 Turn Off Coil Power MOSFET
137 turn on calibration MOSFET
138 measure & calculate coil resistance
139 calculate coil temp
140 measure RTD value and compare to coil temp
141 feed RTD verified coil temperature PID loop
142 map PID output value to MCU PWM value range
143 apply PWM value to coil power MOSFET PWM gate signal
144 temperature control loop
145 log total duration of user button press
146 log amperage during press—every 250 ms
147 log coil voltage during press—every 250 ms
148 calculate power usage during button press (joules)
149 battery retrieves hashed number from cartridge chip
150 get manufacturer programmed potency on cartridge chip
151 use volume and potency to calculate total dose
152 update total usage and dosage on cartridge memory

DETAILED DESCRIPTION OF THE PREFERRED EMBODIMENT

Glossary

ADC stands for analog to digital converter
CS resistor stands for current sense resistor
$I^2C$ stands for inter-integrated circuit protocol, a type of data communication protocol that is pronounced 'I squared C'. The squared notation in the acronym denotes two word alliteration so the data being sent in this invention by the $I^2C$ protocol does not necessarily have any variables that are being mathematically squared.
MCU stands for microcontroller unit
MOSFET stands for metal oxide semiconductor field effect transistor
PCB stands for printed circuit board
PWM stands for pulse width modulation, which is a fancy way of saying turning something on and off quickly like a kid playing with a light switch
RAM stands for random access memory
ROM stands for read only memory
RTD stands for resistance temperature detector, otherwise known as a temperature resistor
RTDC stands for resistance temperature detector converter
SPI stands for serial peripheral interface, which is asynchronous serial communication interface
USB stands for universal serial bus As seen in FIG. 1, a cartridge connector 34 is an electrical connector that has multiple electrical contacts for connecting the cartridge to the battery 59 and other electronic components in the electronic vaporizer system. The cartridge connector can be a socket or plug for example. Preferably, the cartridge connector 34 is formed as a USB C 24 pin plug which is preferably nonstandard USB wiring to prevent unintentional connection to other USB C devices. The cartridge connector 34 preferably has double-sided orientation free connection. The cartridge connector 34 preferably cooperates with keyed plastic guides 35 that provide an anti USB C insertion protection feature. The keyed plastic guides 35 on the cartridge section match keyed plastic guides 35 on the battery section. The cartridge connector 34 can be formed as a magnetic latch connection to allow an insertion free physical and electrical connection.

The mixing and cooling chamber 21 provides an area for airflow to mix with hot vapor so that the hot vapor temperature is safe for inhalation. The vapor outlet 22 is connected to the mixing cooling chamber 21 to provide an opening for user aspiration. The airflow chimney 23 is connected to the vapor outlet 22 and the mixing cooling chamber 21. The airflow chimney 23 receives an airflow from an electrical coil that generates heated vapor. The heated vapor is generated from heating an oil that is stored in a vaporizing liquid storage tank 24. The vaporizing liquid is typically an oil, such as vape juice or oil for short. A ceramic coil 25 is formed as a metal coil embedded in a ceramic matrix. The metal coil heats as a resistance heater upon application of an electric current. The ceramic coil 25 is at least partially encapsulated by a cotton wrap 26. A distillate sponge 27 can draw oil from the vaporizing liquid storage tank 24 and pass it to the cotton wrap 26, which is then passed to the ceramic matrix, which then is heated by the metal coil which generates the vapor. The cotton wrap 26 is for the ceramic coil and resistance temperature detector 28 (RTD). The ceramic coil is not a coil made of ceramic, but is a metal resistance heater coil embedded within a ceramic matrix. An air inlet gasket filter 29 can be mounted to a coil lower sealing gasket 30 to provide air filtration. The coil lower sealing gasket 30 can be formed as a one-way valve to allow intake of air into the ceramic coil 25 and resistance heater apparatus.

The electronics include a printed circuit board 31 (PCB) which has a variety of different electrical connections. The printed circuit board 31 preferably has connecting points 32 for the ceramic coil and RTD, but the connecting points 32 could also be on a socket or plug. The connecting points for coil and RTD can be formed as a plurality of electrical contact pads that receive a soldered wire connection, or receive a spring-loaded pin connection. Preferably, a universal serial bus type C twenty four pin plug 34 connects a lower end of the printed circuit board 31 to the battery component. One or more keyed plastic guides 35 can provide insertion reversal protection and polarize the connection between the battery and the cartridge. The cartridge is thus modularly assembled to the battery to allow disassembly and reassembly when replacing cartridges and batteries.

Figure 2:
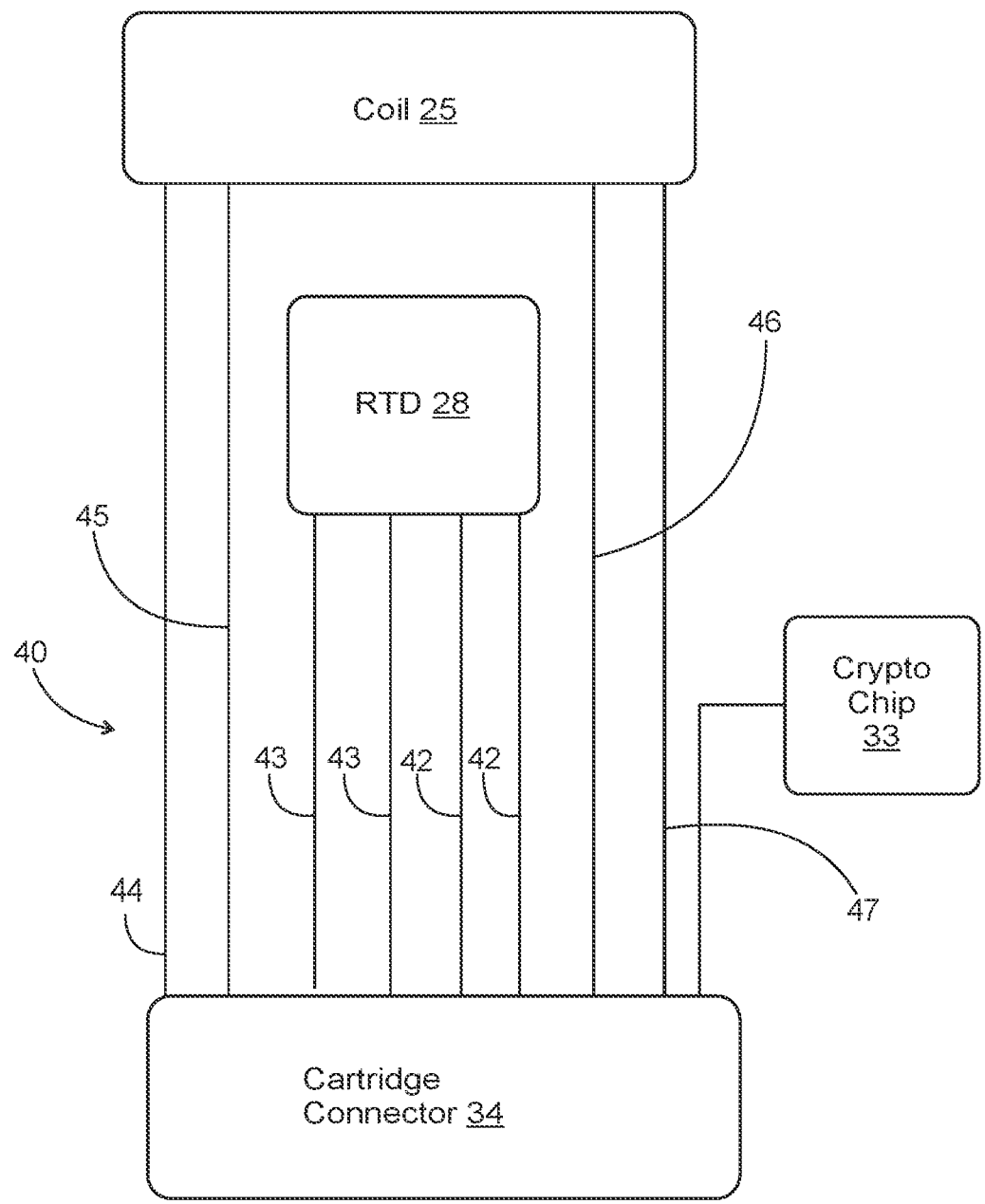
FIG. 2 is a primary component diagram for an electronic cigarette cartridge.

As seen in FIG. 2, in a cartridge section 60, an electrical diagram of the cartridge primary component diagram shows that the ceramic coil 25 and the RTD 28 are mounted in close proximity to allow thermal transmission between the ceramic coil and the RTD. The electrically heated ceramic coil 25 and a cryptography chip 33 are both electrically connected to a cartridge connector. The cartridge connector 34 can be a socket or plug that could be a universal serial bus type of connection that can connect to a battery or other external power supply.

The cartridge connections 40 provide a number of electrical contacts between the cartridge connector and the electrical components of the cartridge. These cartridge connections 40 can include wires, trace, a portion of the external metal housing or other types of electrical conduits. The resistance temperature detector 28 has a RTD+/−power 42 which can be a pair of wires and also has an RTD sense+/− voltage 43 which can be a pair of wires or leads. Preferably, a ground 44 connects between the cartridge connector 34 and the coil 25. The coil sense+/−voltage 45 connecting between the cartridge connector 34 and the coil 25 provides data for determining voltage applied. The coil power through CS resistor 46 is supplied from the cartridge connector 34 to the coil 25 and is preferably a low-voltage power. The coil 25 also has a coil current sense voltage 47 to provide a current sense and/or voltage sense.

Figure 3:
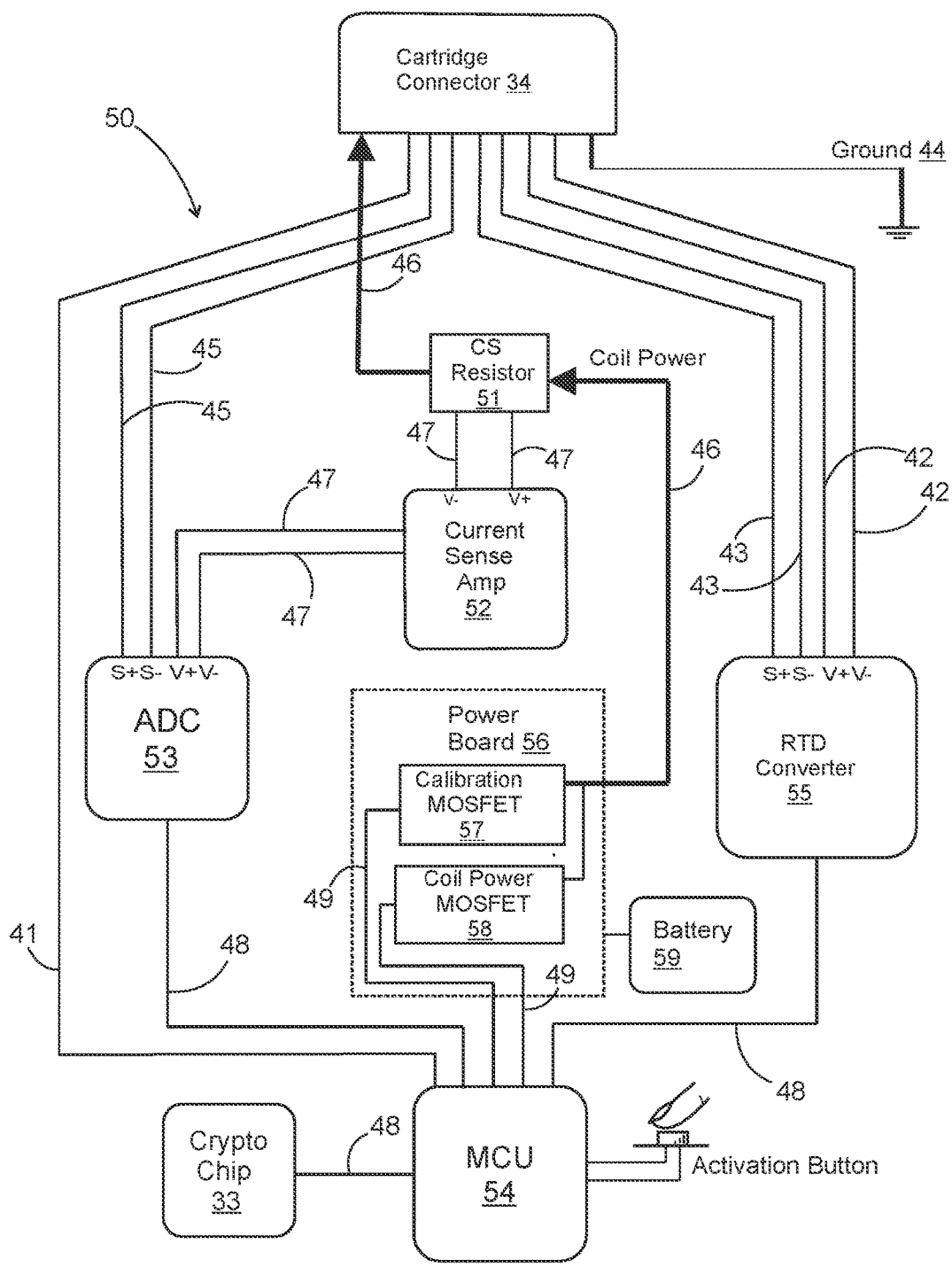
FIG. 3 is a battery primary component diagram.

As seen in FIG. 3, a battery section 70 connects to the cartridge section 60 by the cartridge connector 34. The battery primary component diagram shows all of the electronic components 50 mounted in the battery housing. The battery 59 may also include a charge controller if the battery is a rechargeable battery. For purposes of this invention, the key feature of the present invention is a power board 56 which has a calibrating MOSFET 57 and a coil power MOSFET 58 which are connected to the current sense resistor 51. As current passes through the current sense resistor 51, the current sense amp 52 receives a coil current sense voltage 47 through a positive voltage line and a negative voltage line. The coil current sense voltage 47 is picked up by the analog to digital converter 53 (ADC) and the analog to digital converter 53 passes the signal to a SPI & I²C data 48 line to a microcontroller unit 54 (MCU).

The microcontroller unit 54 is connected to a cryptographic chip 33 via a SPI & I²C data 48 line. The SPI & I²C data 48 line can be formed as a bundle of wires, or a bus, or a plurality of parallel circuit board trace lines. The analog to digital converter 53 is connected to the cartridge connector 34 at the coil sense+/−voltage 45. The coil sense+/−voltage 45 therefore connects the coil 25 to the analog to digital converter 53 via the cartridge connector 34.

The cartridge connector 34 can be formed as a USB plug or socket. The cryptographic chip 33 can be integrated in the same package as the microcontroller unit 54 and is not necessarily a separate rectangular object mounted on the circuit board next to the microcontroller unit chip.

The microcontroller unit 54 connects to the cryptographic chip 33, and the microcontroller unit is connected to a cryptographic line passing cartridge crypto chip data 41 through the cartridge connector 34 which then continues as cartridge cryptographic chip data 41 to the cryptographic chip 33 on the cartridge primary component diagram as seen in FIG. 2. In short, the apparatus seen on FIG. 3 connects to the apparatus seen on FIG. 2.

The resistance temperature detector converter 55 (RTDC) of the battery has a pair of lines for the RTD+/−power 42 and a pair of lines for the RTD sense+/−voltage 43. With both power and voltage sense, the RTDC 55 convert the SPI & I²C data 48 to receive data from the resistance temperature detector 28 on FIG. 2. A ground 44 is connected to the cartridge connector 34.

The coil power 46 passes through the current sense resistor 51. The current sense resistor 51 has a pair of lines for outputting coil current sense voltage 47 to the current sense amp 52. The current sense amp 52 then outputs coil current sense voltage 47 to the analog to digital converter 53. The analog to digital converter converts to digital to allow the microcontroller unit 54 to read the coil current sense voltage 47, assuming the microcontroller unit doesn't already have an onboard analog to digital converter. The analog to digital converter (ADC) 53 and other electronic components 50 can be integrated in the same plastic package as the microcontroller unit 54. They don't necessarily have to be two separate black plastic rectangular electronic elements soldered on the printed circuit board.

The electronic components 50 also include a MOSFET for controlling power to the coil. The microcontroller unit 54 is configured with a MOSFET PWN control 49 for controlling the power board 56 which has the MOSFET for controlling power to the coil. Thus, the microcontroller unit can control the power board 56 which controls the battery power output to the coil. The micro controller unit (MCU) 54 is also connected to the resistance temperature detector converter (RTDC) 55 so that the microcontroller unit 54 can receive analog inputs from the resistance temperature detector 28 of FIG. 2. Again, some microcontroller units may have integrated analog input functionality so that the resistance temperature detector converter (RTDC) 55 is not necessarily a physically separate part.

Figure 4:
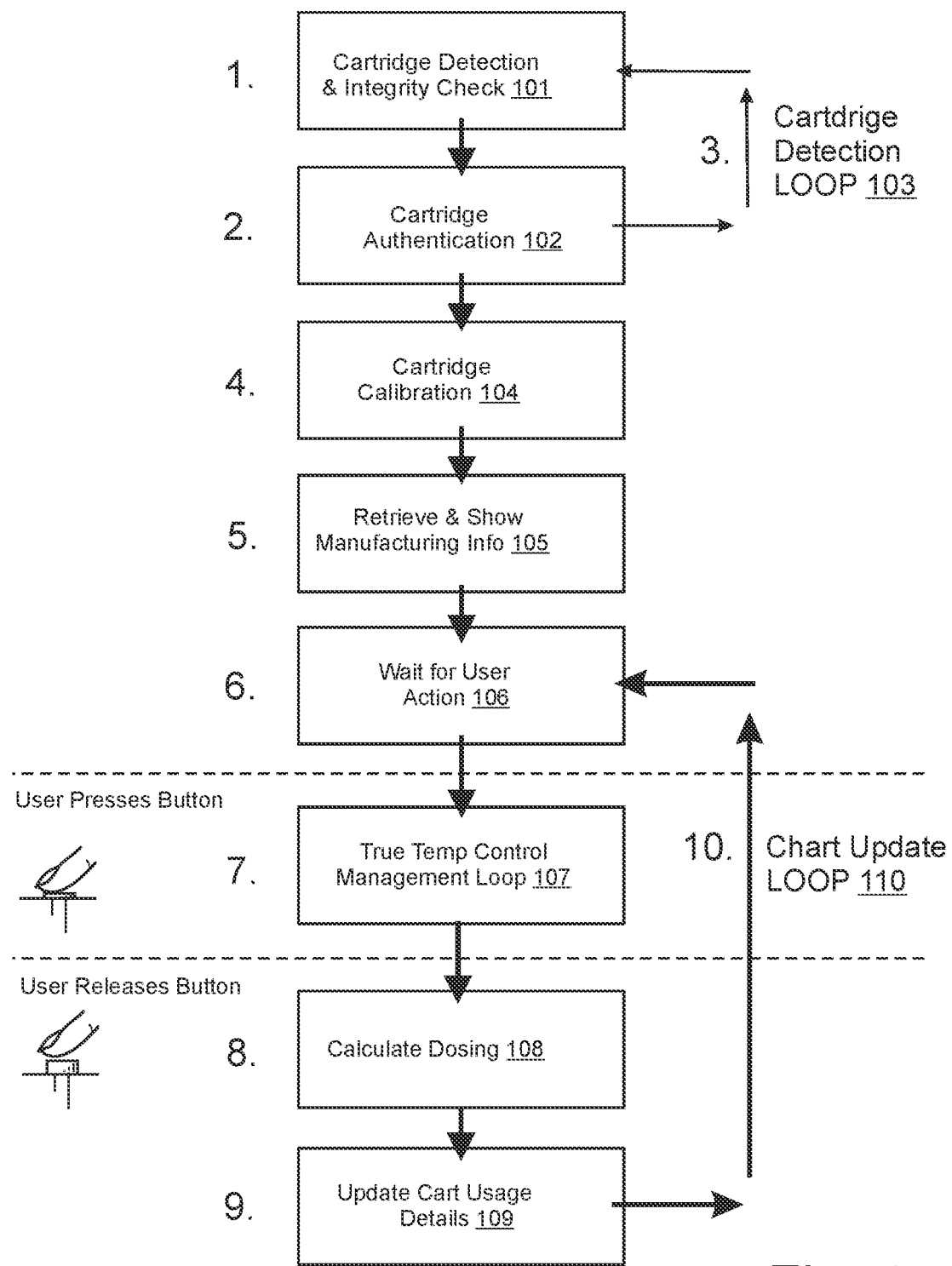
FIG. 4 is a cartridge authentication and calibration procedure flowchart.

As seen in FIG. 4, the microcontroller unit is configured to execute steps for confirming functions and use of the cartridge. In a first step, the cartridge detection & integrity check 101 checks to see if a valid cartridge is present. In a second step, cartridge authentication 102 authenticates the cartridge using the pair of cryptographic chips 33. The first cryptographic chip is in the battery section, and the second cryptographic chip is in the cartridge section.

Should there be lack of authentication, the third step is to execute a cartridge detection loop 103 until the user inserts a cartridge that can pass the cartridge detection and integrity check 101 step. Once the cartridge is authenticated, the next step is the step of cartridge calibration 104. The cartridge can be calibrated by testing and receiving sensory feedback such as through the thermal sensor or the electrical current and voltage sensors. The fifth step is the step to retrieve and show manufacturing information 105. The cartridge data such as the flavor, manufacturing date, lot number and the like are read by the microcontroller unit 54. The microcontroller unit 54 may have access to a storage such as a flash memory that allows the microcontroller unit 54 to maintain a log of user usage and dosage. This memory can be read by plugging the battery section of the device into a PC for example. Alternatively, the message and memory can be read wirelessly such as through Wi-Fi or Bluetooth.

The next step after the cartridge manufacturing information is retrieved is to wait for user action 106. The microcontroller unit waits for the user to confirm that some information is accurate, or generally for the user to begin the next step. The user can confirm by pressing the activation button located on an external sidewall of a housing of the electronic cigarette. The activation button is preferably electrically connected to the microcontroller unit. The next step is the true temp control management loop 107 which verifies that the proper temperature is present. When the user releases the activation button, the true temperature control management loop 107, terminates and the microcontroller unit is configured to continue to the next step to calculate dosage 108. After calculating dosage, the microcontroller unit is configured to update cartridge usage details 109. After the update cart usage details 109 step, the microcontroller unit is configured to enter the chart update loop 110 to wait for user action 106. In this way, the user dosage and usage can be logged for diagnostic or medical purposes.

Figure 5:
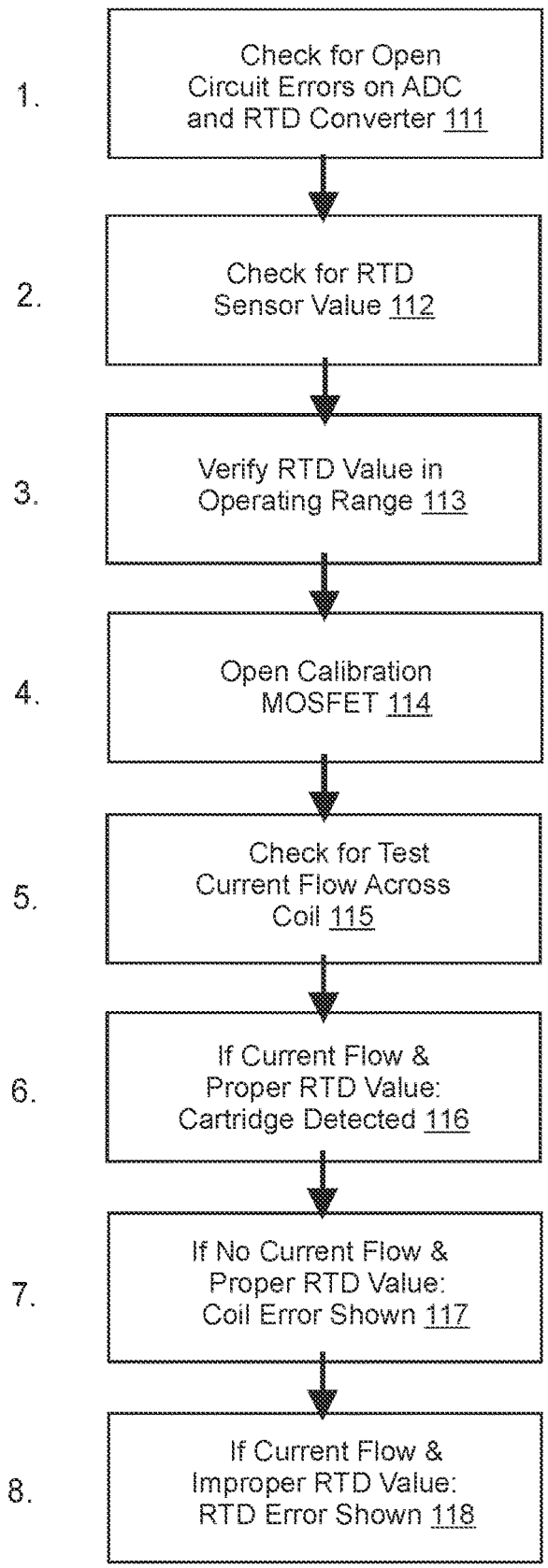
FIG. 5 is a cartridge deduction and integrity check procedure flowchart.

As seen in FIG. 5, the cartridge detection and integrity check process is comprised of several substeps. The first step in the cartridge detection and integrity check is to have the microcontroller unit check for open circuit errors on ADC and RTD converter 111. Then, the microcontroller unit is configured to check for RTD sensor value 112. The microcontroller unit then performs the step to verify RTD value in operating range 113. The microcontroller unit then starts the step of open calibration MOSFET 114. The microcontroller unit then begins the step to check for test current flow across coil 115. The microcontroller unit then checks for several valid states before proceeding. First, the microcontroller unit checks if current flow & proper RTD value: cartridge detected 116. Second, the microcontroller unit checks if no current flow & proper RTD value: coil error shown 117. Third, the microcontroller unit checks if current flow & improper RTD value: RTD error shown 118.

Figure 6:
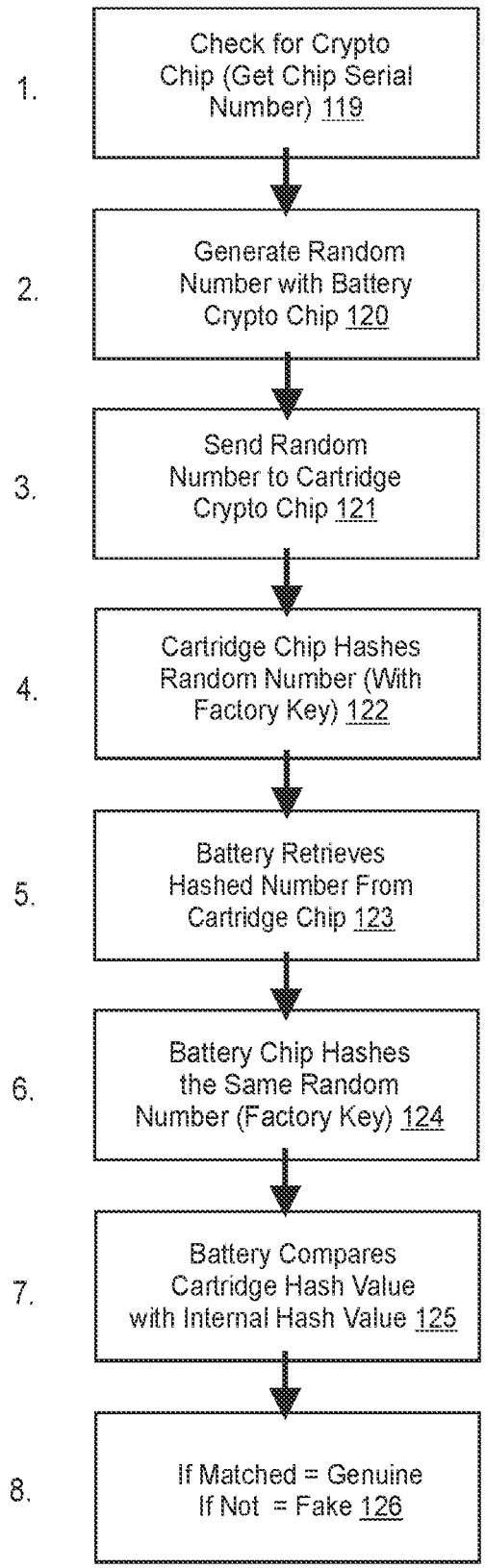
FIG. 6 is a cartridge authentication procedure flowchart.

As seen in FIG. 6, the microcontroller unit also has a cartridge authentication protocol consisting of substeps beginning with the substep to check for crypto chip (Get Chip Serial Number) 119. If the microcontroller unit can see the cryptographic chip on the cartridge section, then the microcontroller unit can begin the step to generate random number with battery crypto chip 120. The random number is passed from the battery cryptographic chip to the microcontroller unit. The microcontroller unit then performs the step to send a random number to the cartridge cryptographic chip 121. The pair of cryptographic chips are designed to work together so that the battery section can authenticate the cartridge section when the battery section cryptographic chip communicates with the cartridge section cryptographic chip.

The next step is that the 'cartridge chip hashes a random number (with factory key)' 122. After that, the microcontroller unit in the battery section performs the step of retrieving the hashed number from the cartridge cryptographic chip 123. The next step is the microcontroller unit battery chip hashes the same random number (factory key) 124. The microcontroller unit located in the battery section is configured to perform the next step where the battery section compares the cartridge cryptographic chip hash value with internal hash value 125. The microcontroller unit then makes a comparison in the step 'if matched=genuine, if not=fake' 126. Therefore, using random number hashing between a pair of matched cryptographic chips, namely the battery section cryptographic chip and the cartridge section cryptographic chip, the microcontroller unit can verify if the cartridge is genuine or fake. The microcontroller unit is configured to operate only when the cartridge is genuine, meaning that the microcontroller unit confirms that the pair of cryptographic chips are matched.

Figure 7:
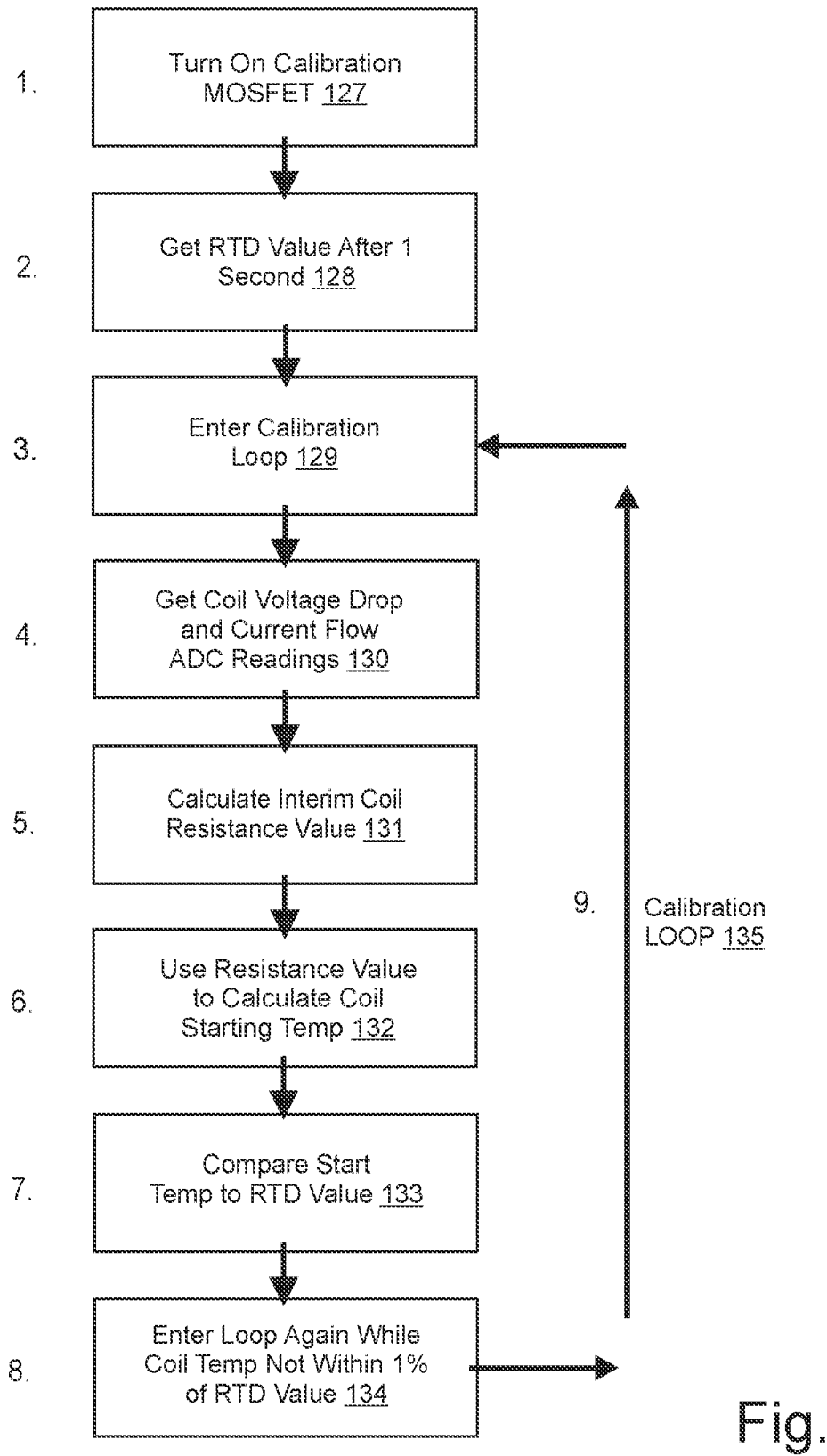
FIG. 7 is a cartridge calibration procedure flowchart.

As seen in FIG. 7, the cartridge calibration procedure preferably includes substeps beginning with a first step to 'turn on calibration MOSFET' 127. After the first step, the microcontroller unit can be configured to execute a delay of a preset time such as one second. The microcontroller unit then performs the step 'get RTD value after one second' 128. The microcontroller unit then performs the step of 'enter calibration loop' 129.

The calibration loop 135 is performed in the microcontroller unit and includes some basic mathematical calculations for optimizing cartridge use such as cartridge optimization calculations. The microcontroller unit is configured to execute the step 'get coil voltage drop and current flow ADC readings' 130. Then, the microcontroller unit processes the step, 'calculate interim coil resistance value' 131. Calculating interim coil resistance value may require data for the voltage and current. The microcontroller unit then processes the step, 'use resistance value to calculate coil starting temp' 132. The microcontroller unit then processes the step, 'compare start temp to RTD value' 133. The microcontroller unit then processes the step, 'enter loop again while coil temp not within one percent of RTD value' 134. The calibration loop 135 suggests that the cartridge optimization calculations are both iterative and ongoing. The cartridge optimization calculations can be stored in a memory of the microcontroller unit.

Figure 8:
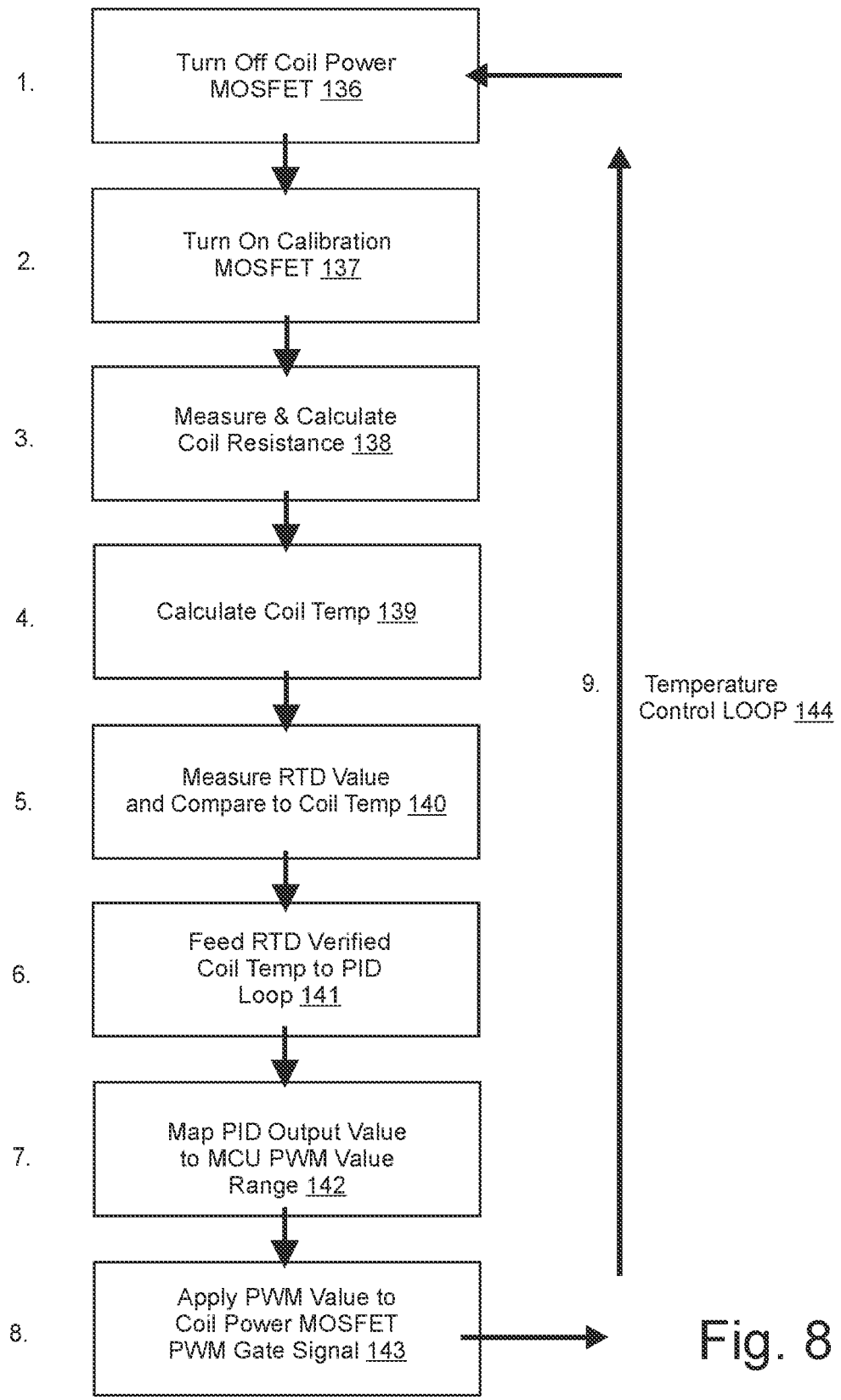
FIG. 8 is a true temperature control flowchart.

As seen in FIG. 8, a true temperature control protocol includes some substeps that are all performed in a temperature control loop 144. The aim of the true temperature control protocol is to provide an accurate temperature. The microcontroller unit begins with a first step which is, 'turn off coil power MOSFET' 136, then a second step, 'turn on calibration MOSFET' 137. By turning off the coil power MOSFET and turning on the calibration MOSFET, the micro control unit starts the process of the true temperature control protocol.

The microcontroller unit is also configured to then perform the step 'measure & calculate coil resistance' 138, then the step 'calculate coil temperature' 139. The coil temperature is calculated using the coil resistance. The microcontroller unit is configured to perform the step, 'measure RTD value and compare to coil temp' 140, then, 'feed RTD verified coil temp to PID loop' 141. The microcontroller unit is configured to perform the step, 'map PID output value to MCU PWM value range' 142. By performing the temperature calibration steps using a lookup table, or analytically with mathematical formulas, the microcontroller unit uses the resistance temperature detector to compare with the coil temperature. The resistance temperature detector thus provides a means for calibration of the heating coil.

The microcontroller unit is also configured to control the battery power through the MOSFET which acts as a switch or relay for providing and controlling power to the resistance heated metal coil wire that is embedded in a ceramic matrix. The microcontroller unit performs the step, 'apply PWM value to coil power MOSFET PWM gate signal' 143. By applying a PWM value to the coil power MOSFET PWM gate signal', the microcontroller unit maintains an accurate temperature while the temperature control loop 144 sub processes and substeps are active.

Figure 9:
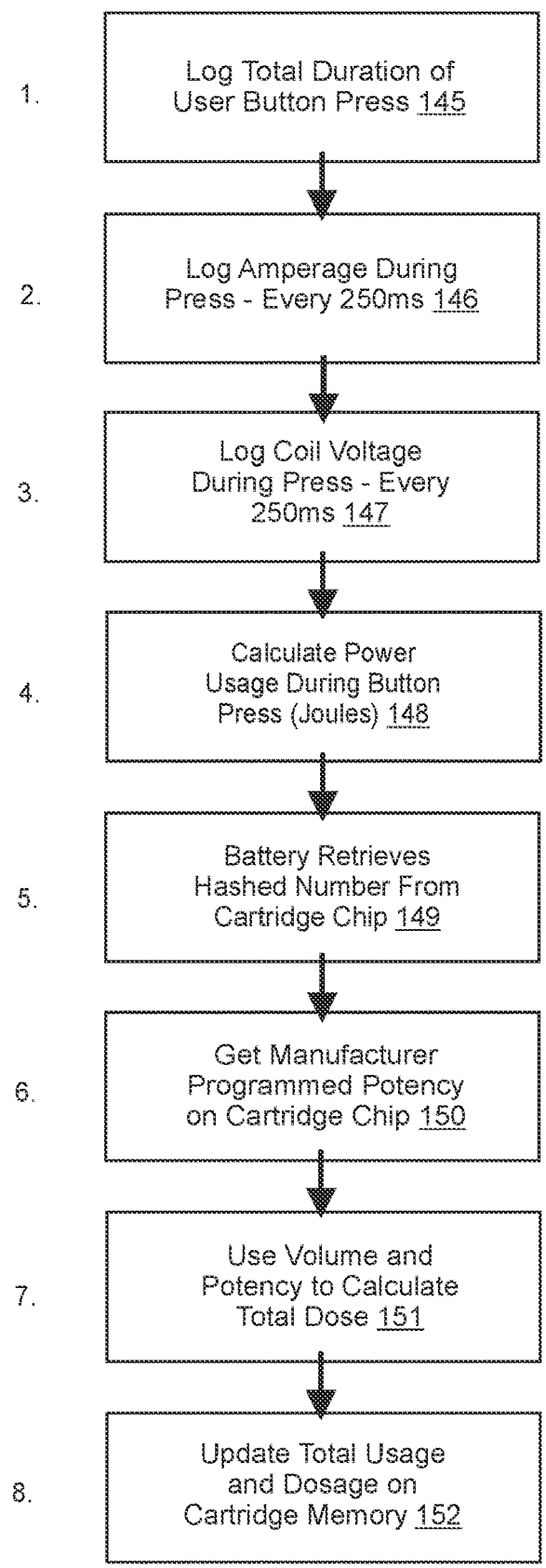
FIG. 9 is a dosage calculation flowchart.

As seen in FIG. 9, the microcontroller unit is also configured to perform a dosage calculation protocol. The dosage calculation can be stored in a memory of the microcontroller unit such as on flash memory that can be read by a PC through the USB data and power connector. The microcontroller unit first performs the step, 'log total duration of user button press' 145. Then, the microcontroller unit logs the current and voltage to determine power usage. Power usage is proportional to the dosage to a user. Thus, the microcontroller unit performs the steps, log amperage during press—every 250 ms' 146 and log coil voltage during press—every 250 ms' 147 to perform the step, 'calculate power usage during button press (joules)' 148. The microcontroller unit can be set for a calculation cycle of 250 ms which is a quarter of a second, but the microcontroller unit could have a calculation cycle of a different interval, such as 100 ms, 200 ms, or 300 ms for example. The microcontroller unit also performs the step, 'battery retrieves hashed number from cartridge chip' 149 to verify the hit that the user is receiving via the cartridge chip data. The cartridge chip may be a cryptography chip that also includes basic data such as product and manufacturing information. The microcontroller unit then performs the step, 'get manufacturer programmed potency on cartridge chip' 150. Because the cryptography chip verifies the potency, the microcontroller unit can use the potency to perform the step, 'use volume and potency to calculate total dose' 151. After calculating the total dosage of the user puff, the microcontroller unit performs the step, 'update total usage and dosage on cartridge memory' 152. Preferably, the cartridge memory is integrally connected to the microcontroller unit. Thus, in selection of the microcontroller, it is preferred to have a certain amount of usable RAM and ROM sufficient for these purposes.

The coil can be formed in a variety of different topologies, and is not necessarily helical.

Figure 10:
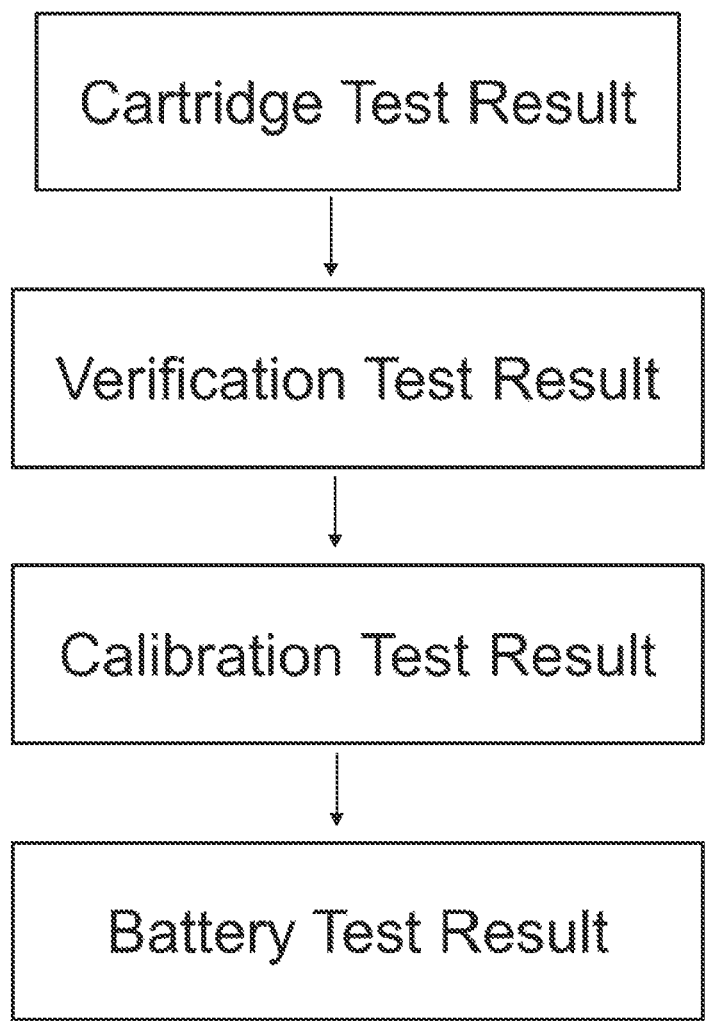
FIG. 10 is a display screen output of the startup screen.
Figure 11:
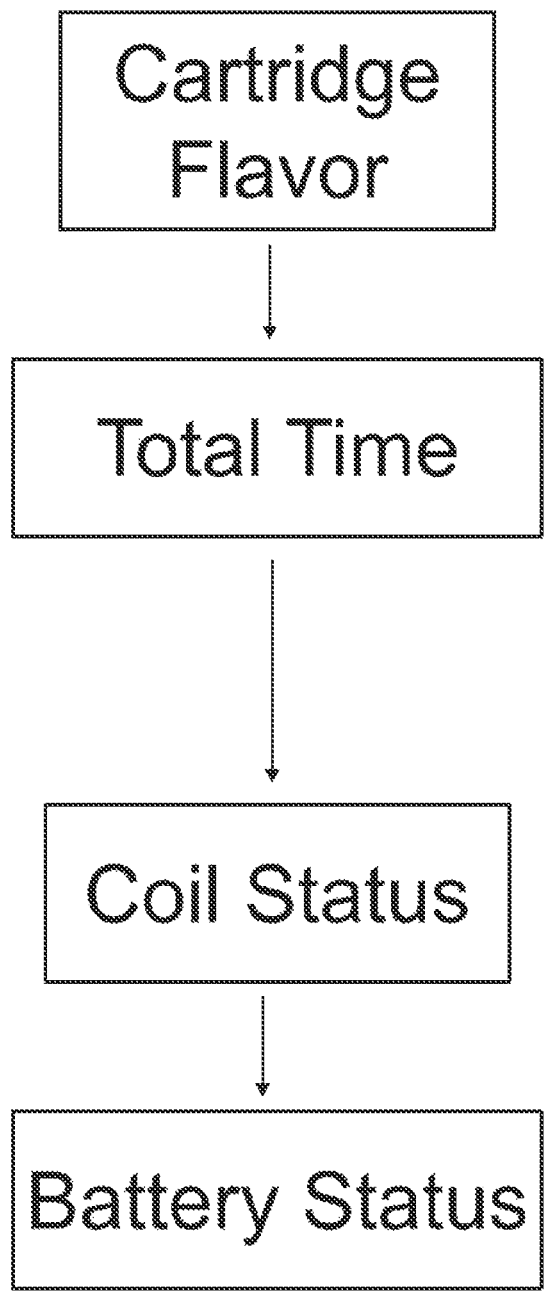
FIG. 11 is a display screen output of the default powered on screen.
Figure 12:
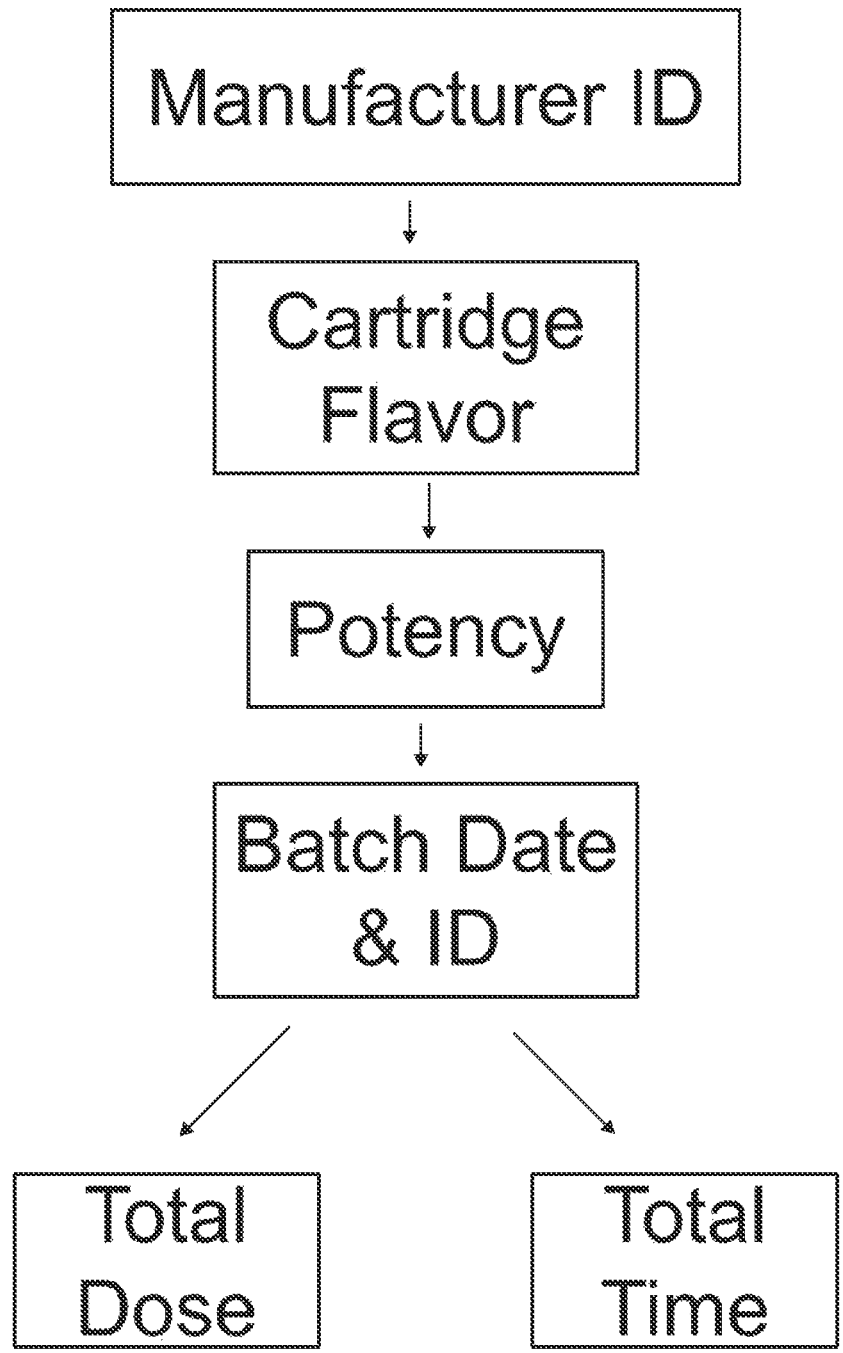
FIG. 12 is a display screen output of the cartridge details screen.
Figure 13:
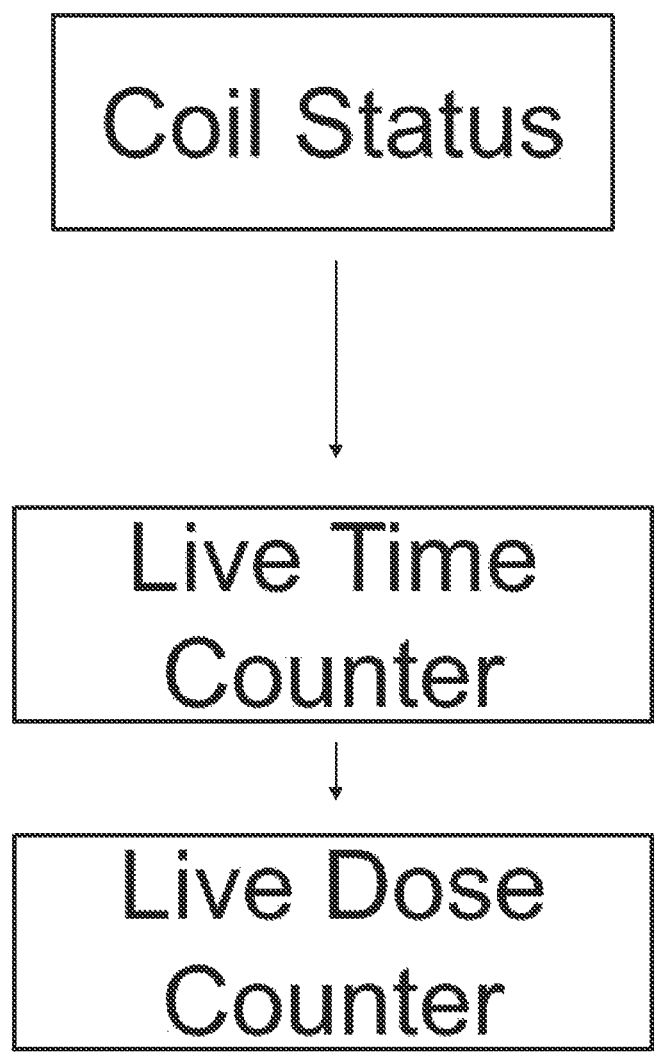
FIG. 13 is a display screen output of the coil activated screen.

A digital display such as an LCD display can provide visual information for the user. The display screen can be mounted at a display screen opening formed on the housing of the present invention. FIG. 10 is a display screen output of the startup screen. The startup screen preferably displays a cartridge test result, a verification test result, a calibration test result, and a battery test result. FIG. 11 is a display screen output of the default powered on screen. The default powered on-screen preferably displays a cartridge flavor, total time, coil status, and a battery status. FIG. 12 is a display screen output of the cartridge details screen. Cartridge details screen preferably displays a manufacturer ID, cartridge flavor, potency, batch date and ID, total dose, and total time. FIG. 13 is a display screen output of the coil activated screen. The coil activated screen preferably displays a coil status, lifetime counter, and a live dose counter.

The system architecture of the present invention provides a variety of different features, which is believed to be the best mode as detailed below.

Feature List

Authentic Cartridge Validation: Uses the battery and cartridge crypto chips that are programmed by trusted vendors on proprietary internet-connected programming stations. True Temperature Control: A PID (a type of control loop that is finely tuned for use on atomizer coils) controlled algorithm that integrates an MCU calculated temperature of the atomizer coil along with a high-accuracy RTD temperature reading (provided by the RTD converter).

The atomizer coil calculated temperature is calibrated each time the device is turned on and each time a new cartridge is inserted. The RTD is used as a trusted external baseline value when calibrating the atomizer coil. The goal is to make sure that the starting resistance value of the atomizer coil is within 1% of the actual value. This is done by following these steps:

1. Query the RTD converter chip and retrieve the latest temperature reading. This is the coil's starting temperature.
2. Pass a small calibration current (50-100 mA) through the atomizer coil. This is not enough to cause self-heating. The calibration MOSFET is activated in order to allow this current to pass through a current-limiting resistor.
3. While the calibration current is flowing, the voltage directly before and after the coil is measured. This allows for calculation of the voltage drop across the coil. For example: If the voltage before the coil is 5V and the voltage after is 4.5V, then 0.5V is dropped across the coil.
4. The calibration current is accurately measured by the MCU through a current sense resistor. The small voltage drop across the resistor is amplified by the current sense amplifier. The output signal is then measured by the high-accuracy ADC. The MCU then converts this into a current value.
5. Ohms Law is V=I R with voltage drop as "V" and current as "I". After measuring voltage drop and current, the MCU divides the voltage drop by the current value. The result is the calculated resistance of the atomizer coil.
6. The calculated resistance is then used as the temporary starting resistance of the coil.
7. The coil's resistance is then calculated again.
8. Using the starting temp, starting resistance, newly calculated resistance, and the temperature coefficient of the atomizer coil material, the calculated temperature of the coil can be derived.
9. If the coil's calculated temperature is within 1% of the RTD's current temperature, then calibration passes, and the user can safely and accurately use true temp control. If the coil's calculated temperature is not within 1%, steps 1-8 are performed again.

During normal operation, the True Temperature Control algorithm will compare the live calculated temperature of the coil against the live RTD temperature. This provides an external checks and balances in case of errors with the coil temperature calculation system (after calibration). If the calculated temperature appears normal and the RTD value is abnormal, then power to the atomizer coil will be cut and a cartridge integrity check will be performed along with re-calibration.

Coil Temperature Setpoint: Either set by the user, by default, or by a value suggested by the cartridge vendor. This is the setpoint that the True Temperature Control algorithm uses when controlling the coil's temperature.

In-Cartridge Measurement: Uses a 4-wire measurement technique that is the lab standard for high accuracy voltage measurements. The 4-wire measurement is done with both the atomizer coil and the RTD. One pair of wires is used to send current through the atomizer coil along with another pair of wires for the RTD. A separate pair of wires is used to measure the voltage drop across the atomizer coil along with another pair to measure the RTD. With no current flowing through the voltage measurement wires, there is no worry of current-induced voltage drop that distorts the reading and consequent calculations that are based on that reading.

Dosage Calculation: Uses batch-specific potency data programmed into every single cartridge. The device can calculate the total volume of liquid vaporized during each time the user activates it. Potency and volume can be used to calculate the total dosage.

Previous Use Dosage: A value showing the total dosage of the most recent user interaction. This provides valuable feedback so that a user is aware of their total dosage after each use.

Dosage Limiter: A value that is optionally set or set by default. The device will calculate a live dosage as it is being activated and used. Once the dosage limit value is reached, power flow to the atomizer coil will be stopped. This allows for incredibly precise dosing based on the device's use case.

Total Dosage Counter: A counter showing the cumulative dosage for a cartridge (in mg or other appropriate value). This value cannot be erased or reduced. It is stored on the crypto chip. If a counterfeiter tried to refill used cartridges, a user will see the existing counter value as evidence of use before purchase.

Total Time Counter: A counter showing the cumulative usage time for a cartridge (in seconds). This value cannot be erased or reduced. It is stored on the crypto chip. If a counterfeiter tried to refill used cartridges, a user will see the existing counter value as evidence of use before purchase.

Per Cartridge Batch Info: Each cartridge is programmed with the batch ID, filing date, date of expiration, potency, and flavor. This can be easily accessed by a user to verify against cartridge packaging, for general information, and to aide vendors in tracking down suspect batches.

Cryptography Details

A crypto chip can have multiple functions and features, including:
1. The ability to query and receive the unique serial number of that crypto chip
2. The ability to generate a random number
3. The ability to do symmetric encryption with an SHA-256 hash algorithm and a secret key.
4. The ability to store data on the chip's internal memory
5. The ability to lock data banks after writing data The MCU must communicate with the crypto chip in order to execute any of these functions and to process the returned values. A secret key will be selected during each model refresh. This key will be programmed onto the internal memory of the battery and cartridge crypto chip. It will not reside on the MCU memory. It is nearly impossible to retrieve this key from the crypto chip's internal memory. But, the MCU can order the crypto chip to utilize the secret key when hashing with the SHA-256 algorithm. The secret key value is never communicated between the MCU and crypto chips. The crypto chip functions as a chain of custody verification. All cartridges that are produced will have an unprogrammed crypto chip when leaving the factory. Cartridges can only be programmed by a programming station that is leased to partner vendors. The programming station will only function after being authenticated by remote servers that control cartridge serialization and batch sizes on a per batch basis.

Hashing requires three things: a string of number or text to be hashed (hashing is the conversion of a string of data into a fixed-length numerical output); the ability to run the SHA-256 Hash Algorithm (built into the crypto chip); and a secret key that influences the hashed output in a consistent way.

The specific steps include:
1. The battery side crypto chip generates a random number and the MCU retrieves it.
2. The MCU sends this random number to the cartridge crypto chip and temporarily stores it in the crypto chip's memory.
3. The MCU then requests that the cartridge crypto chip hash the random number with the SHA-256 algorithm by using the already programmed secret key on the cartridge crypto chip.
4. The cartridge crypto chip generates a numeric hash value and the MCU retrieves it.
5. The MCU then repeats steps 2-4 with the battery side crypto chip.
6. If the cartridge and battery side crypto chips are both programmed with the same secret key then the hashing algorithm will be influenced in the same way and the numerical hash value will be the same (assuming the same data-to-be-hashed is sent to both chips).
7. If an unprogrammed cartridge is stolen/diverted to non-partner vendors, then there will be no internal secret key to successfully perform the hashing request. Additionally, if the wrong secret key is programmed, then the numerical hash output of the battery and cartridge will not match.

The programming station will be loaded with batch-specific data before validating with external servers and activating for a limited period of time. This data includes the loading data, expiration date, potency, flavor, batch ID, cartridge serial number (in addition to the unique serial of the crypto chip). This allows for full tracking of a cartridge's production history.

A second embodiment of the present invention is to prepare a coil power measurement based on a pre-calibrated coil resistance measurement data recorded on the cryptography chip. The pre-calibrated coil resistance measurement data improves the coil power measurement. The coil is calibrated during final QA tests and post-assembly. A high-accuracy resistance measurement is recorded on the cryptography chip such that every product is unique and customized with a slightly different resistance measurement. The second embodiment has no RTD-based calibration routine and supporting circuitry. The drawback of the second embodiment is that the four wire control of the coil will still allow for low deviation temperature control based on accurate resistance calculations during use. However, objective temperature accuracy is inherently accurate since the battery section is assuming the internal temperature is the same as the temperature of the coil in the cartridge which may create an inaccurate offset in all session calculations.

In a third embodiment of the present invention, the coil is calibrated during the final QA tests post-assembly. The high accuracy resistance measurement is recorded on the cryptography chip to provide a pre-calibrated coil. Optionally this pre-calibrated coil, with an RTD in the cartridge, would give the calibration loop an accurate starting resistance value and an accurate coil temperature value to calculate from, which would be an improvement of the original design and allow for even greater startup calibration accuracy. If dosing is included, the pre-calibrated coil provides more accurate real-time temperature control and dosing calculations.

In a fourth embodiment of the present invention, the cartridge with a pre-calibrated coil and pre-characterize dosing amount increases accuracy of the RTD calibration process and the true temperature control. The coil has also been pre-characterized to create a chart of the volume of liquid versus Jules used. This along with potency information allows for a cartridge and batch specific jewel to milligram conversion formula that is stored on the cryptography chip. The battery calculates tools used during a session and retrieves a formula to calculate dosing. The drawback of this embodiment is if batch to batch coil manufacturing variances are not controlled, then dosing calculation variations would be greater. However, assuming that coil manufacturing variances and cartridges have low manufacturing variance, a pre-calibrated coil resistance and pre-characterize coil volume per jewel provides greater accuracy.

In a fifth embodiment of the present invention provides a simplified version of the invention. Optionally, a display screen, temperature selection, manufacturing data and potency data and dosing data can be omitted to decrease battery consumption. The RTD converter can also be removed which would conserve costs for the battery and cartridge. The cryptography chip stores the pre-calibrated coil resistance along with the temperature setpoint. The authentication coil errors will use LEDs on the battery to alert the user. This provides a true temperature control which can use the 4-wire method to maintain a hard-coded temperature setpoint based on preset data. The third embodiment of the present invention has simplified functionality while still retaining the generational improvements of the 4-wire control.

The invention claimed is:

1. A vaporizer system comprising:
   a. a cartridge section, wherein the cartridge section further includes a cartridge connector connecting to a resistance heater formed as a coil, a resistance temperature detector, and a cartridge section cryptography chip;
   b. a battery section, wherein the battery section connects to the cartridge section at the cartridge connector;
   c. a battery mounted within the battery section, wherein the battery section further includes a microcontroller unit with a memory, wherein the microcontroller unit is electrically connected to a resistance temperature detector converter, wherein the resistance temperature detector converter is electrically connected to the resistance temperature detector when the battery section is connected to the cartridge section at the cartridge connector;
   d. a power board, wherein the power board includes coil power MOSFET, wherein the coil power MOSFET is configured to control a battery output to a coil power that passes through the cartridge connector from the battery section to the cartridge section, wherein the coil power heats the coil; and
   e. a current sense resistor mounted in the battery section, wherein the current sense resistor senses current of the coil power to provide a coil power measurement, wherein the coil power measurement is based on a pre-calibrated coil resistance measurement data recorded on the cryptography chip, whereby the pre-calibrated coil resistance measurement data improves the coil power measurement.

2. The vaporizer system of claim 1, wherein the resistance temperature detector converter converts analog inputs of the resistance temperature detector for the microcontroller unit.

3. The vaporizer system of claim 1, wherein the power board further includes a calibration MOSFET that assists in calibration of the coil temperature.

4. The vaporizer system of claim 1, wherein the micro controller unit is configured to calculate dosage, based on a user pressing an activation button.

5. The vaporizer system of claim 4, wherein the micro controller unit is configured to calculate dosage with a dosage calculation protocol which includes the substeps of:
   a. logging a total duration of user activation button pressing;
   b. logging an amperage at set intervals during the user activation button pressing;
   c. logging a coil voltage at set intervals during user activation button pressing;
   d. calculating power usage during user activation button pressing;
   e. calculating volume of liquid turned into vapor by power usage;
   f. retrieving manufacturer programmed potency on the cartridge section;
   g. using volume and potency to calculate a total dose; and
   h. updating the total dose on the memory.

6. The vaporizer system of claim 1, wherein the micro controller unit is configured to calibrate the cartridge section.

7. The vaporizer system of claim 6, further including a calibration MOSFET, wherein the micro controller unit is configured to calculate dosage with a dosage calculation protocol which includes the sub steps of:
   a. activating the calibration MOSFET;
   b. receiving an RTD value;
   c. today a car voltage drop and current flow ADC readings;
   d. calculating interim coil resistance value;
   e. using resistance value to calculate coil starting temperature; and
   f. comparing coil starting temperature to the RTD value.

8. The vaporizer system of claim 1, wherein the micro controller unit is configured to detect the cartridge section and verify the authenticity of the cartridge section.

9. The vaporizer system of claim 8, wherein the micro controller unit is configured to detect the cartridge section and verify the authenticity of the cartridge section which includes the sub steps of:
   a. retrieving a chip serial number from the cartridge section cryptography chip;
   b. generating a random number with the battery section cryptography chip;
   c. sending a random number to the cartridge section cryptography chip;
   d. enabling the cartridge section cryptography chip to hash a cartridge section cryptography chip random number from a factory key;
   e. receiving the cartridge section cryptography chip hashed number from the cryptography chip;

f. enabling the battery section cryptography chip to hash the same random number with the factory key to generate a battery section cryptography chip hashed number; and g. comparing the battery section cryptography chip hashed number to the cartridge section cryptography chip hashed number.

10. The vaporizer system of claim 1, wherein the microcontroller is configured to calibrate a temperature of the coil.

11. The vaporizer system of claim 1, wherein the vaporizer system further includes a battery section cryptography chip, wherein the battery section cryptography chip is mounted in the battery section, wherein the vaporizer system further includes a cartridge section cryptography chip, wherein the cartridge section cryptography chip is mounted in the cartridge section, wherein the battery section cryptography chip matches the cartridge section cryptography chip and can authenticate through the microcontroller unit.

12. The vaporizer system of claim 11, wherein the resistance temperature detector converter converts analog inputs of the resistance temperature detector for the microcontroller unit.

13. The vaporizer system of claim 11, wherein the power board further includes a calibration MOSFET that assists in calibration of the coil temperature.

14. The vaporizer system of claim 11, wherein the micro controller unit is configured to calculate dosage, based on a user pressing an activation button.

15. The vaporizer system of claim 14, wherein the micro controller unit is configured to calculate dosage with a dosage calculation protocol which includes the substeps of:
    a. logging a total duration of user activation button pressing;
    b. logging an amperage at set intervals during the user activation button pressing;
    c. logging a coil voltage at set intervals during user activation button pressing;
    d. calculating power usage during user activation button pressing;
    e. calculating volume of liquid turned into vapor by power usage;
    f. retrieving manufacturer programmed potency on the cartridge section;
    g. using volume and potency to calculate a total dose; and
    h. updating the total dose on the memory.

16. The vaporizer system of claim 11, wherein the micro controller unit is configured to detect the cartridge section and verify the authenticity of the cartridge section.

17. The vaporizer system of claim 16, wherein the micro controller unit is configured to detect the cartridge section and verify the authenticity of the cartridge section which includes the substeps of:
    a. retrieving a chip serial number from the cartridge section cryptography chip;
    b. generating a random number with the battery section cryptography chip;
    c. sending a random number to the cartridge section cryptography chip;
    d. enabling the cartridge section cryptography chip to hash a cartridge section cryptography chip random number from a factory key;
    e. receiving the cartridge section cryptography chip hashed number from the cryptography chip;
    f. enabling the battery section cryptography chip to hash the same random number with the factory key to generate a battery section cryptography chip hashed number; and
    g. comparing the battery section cryptography chip hashed number to the cartridge section cryptography chip hashed number.

18. The vaporizer system of claim 11, wherein the microcontroller is configured to calibrate a temperature of the coil.

19. The vaporizer system of claim 1, wherein the micro controller unit is configured to calibrate the cartridge section.

20. The vaporizer system of claim 19, further including a calibration MOSFET, wherein the micro controller unit is configured calibrate the cartridge section which includes the substeps of:
    a. activating the calibration MOSFET;
    b. receiving an RTD value;
    c. receiving a voltage drop and current flow ADC readings;
    d. calculating interim coil resistance value;
    e. using resistance value to calculate coil starting temperature; and
    f. comparing coil starting temperature to the RTD value.

* * * * *